J. B. WELLS.
Buggy-Seats.

No. 157,144.

Patented Nov. 24, 1874.

Witnesses:
W. W. Dodge
W. H. Steiger

Inventor:
James B. Wells,
by Dodge & Son,
Attys.

UNITED STATES PATENT OFFICE.

JAMES BARKER WELLS, OF PORTAGE, WISCONSIN.

IMPROVEMENT IN BUGGY-SEATS.

Specification forming part of Letters Patent No. 157,144, dated November 24, 1874; application filed August 29, 1874.

*To all whom it may concern:*

Be it known that I, JAMES B. WELLS, of Portage, in the county of Columbia and State of Wisconsin, have invented certain Improvements in Carriage-Bodies, of which the following is a specification:

My invention consists in mounting the body of a buggy or similar vehicle on two side bars, in such a manner that it can be moved forward or back thereon, and secured in either position, to enable one or two seats to be used at pleasure, as hereinafter more fully described.

Figure 1:
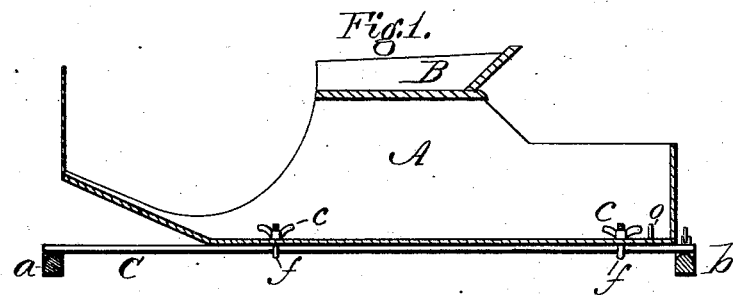
Figure 2:
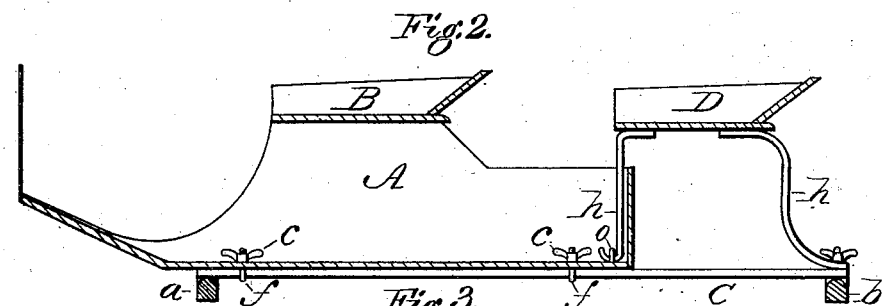
Figure 3:
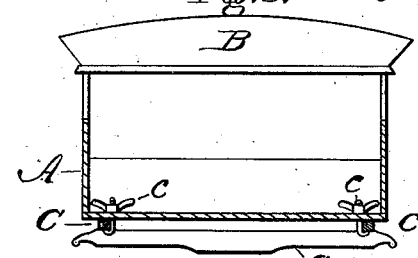

Figure 1 is a side elevation in section, showing it arranged as a single-seated vehicle. Fig. 2 is a similar view, representing it arranged as a double-seated one. Fig. 3 is a transverse section; and Fig 4, a sectional view enlarged, to show the mode of securing the body in place.

Figure 4:
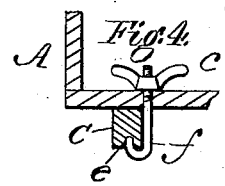

In the drawings, A represents the body or box of a buggy, it being supported on two longitudinal bars, C, which latter are secured at their ends upon the front and rear cross-bars *a* and *b*, which latter may be mounted on springs in the usual manner. The body A rests on the bars C, and is secured thereon by four or more clip-bolts, *f*, the lower ends of which, as shown in Fig. 4, are bent upward to fit into holes or cavities *e* in the under side of the bars C, these bolts extending up through the bottom of the box, and being provided with thumb-nuts *c*, as shown in the several figures. I then provide an extra seat, D, which is mounted on suitable legs or supports *h*, as represented in Fig. 2. When it is desired to use the vehicle as a single-seated one, the body A is slid back on the bars C to the position shown in Fig. 1, and secured in place by the clips *f* and nuts *c*.

When desired to use the two seats, the body is moved forward on the bars C, and fastened as before, and then the rear seat D is mounted, as shown in Fig. 2, the front legs resting inside of the body A, where their lower bent ends engage in staples O, while the rear legs *h* are secured by the bolts and nuts which fasten the rear ends of the side bars C to the rear cross-bar *b*, as shown in Fig. 2. If desired, the rear seat D may have a box arranged under it, also; or, instead of being supported on the legs *h*, it may be supported on a box resting on the bars C in rear of the main body A.

By these means I provide a vehicle which can be readily converted from a single to a double seat, or vice versa, and in which the rear seat need not be carried when not in use. By this means, also, the weight is suitably adjusted on the springs, whether one or both seats be used.

Having thus described my invention, what I claim is—

1. The body A of a carriage supported on and combined with the side bars C, and adjustable longitudinally thereon, substantially as set forth.

2. In combination with the adjustable body A and bars C, the detachable seat D, constructed to operate substantially as described.

3. The adjustable body A, the bolts *f*, provided with nuts *c*, and having their lower ends engaging in recesses in the bars C, all combined as and for the purposes set forth.

JAMES BARKER WELLS.

Witnesses:
 O. P. WILLIAMS,
 JAMES B. TAYLOR.